(12) United States Patent
Krecek et al.

(10) Patent No.: US 6,881,017 B1
(45) Date of Patent: Apr. 19, 2005

(54) HOLE SAW GUIDE ADAPTOR

(76) Inventors: John J. Krecek, 11803 Alpha Rd., Hiram, OH (US) 44234; Raymond J. Brobst, 4232 Newcomb Rd., Stow, OH (US) 44224

( * ) Notice: Subject to any disclaimer, the term of this patent is extended or adjusted under 35 U.S.C. 154(b) by 111 days.

(21) Appl. No.: 10/335,158

(22) Filed: Dec. 31, 2002

(51) Int. Cl.$^7$ .............................................. B23B 51/04
(52) U.S. Cl. ......................... 408/204; 408/201; 408/79; 408/239 R
(58) Field of Search ............................... 408/204, 205, 408/206, 207, 209, 703, 201, 239 R, 231, 233, 79, 80, 81

(56) References Cited

U.S. PATENT DOCUMENTS

| | | | | |
|---|---|---|---|---|
| 3,647,310 A | * | 3/1972 | Morse | 408/239 R |
| 4,968,189 A | * | 11/1990 | Pidgeon | 408/1 R |
| 5,413,437 A | * | 5/1995 | Bristow | 408/1 R |
| 5,624,213 A | * | 4/1997 | Anderson | 408/206 |
| 6,676,343 B1 | * | 1/2004 | Burk | 408/204 |

FOREIGN PATENT DOCUMENTS

| | | | | |
|---|---|---|---|---|
| JP | 10-71517 | * | 3/1998 | B23B/51/04 |
| JP | 2000-107919 | * | 4/2000 | B23B/51/04 |

* cited by examiner

*Primary Examiner*—Daniel W. Howell

(57) ABSTRACT

The hole saw guide adaptor is a special adaptor for a standard hole saw which allows an individual to enlarge an opening in a wood or other work surface after an opening has already been cut in the surface. This adaptor allows an individual to increase the diameter of an existing hole that was cut with a hole saw. The adaptor would generally have a cylindrical configuration with a flattened portion on one end that allows it to be inserted into the hole saw arbor and locked into place with the set screw. The other end of the adaptor would include a threaded area similar to that on the lower end of any standard hole saw arbor. Thus, the hole saw used to cut the initial hole can be threaded onto this end of the adaptor, with the cutting edge facing away from the opening, to be used as a guide for cutting the new hole. The hole saw with the larger diameter for the new hole would be mounted in a conventional manner in the hole saw arbor. A special bushing nut is provided for use on the threaded end of the adaptor when the smaller diameter hole saw has a larger mounting aperture than the adaptor.

4 Claims, 2 Drawing Sheets

HOLE SAW GUIDE ADAPTOR

BACKGROUND OF THE INVENTION

Field of the Invention

The present invention relates to an adaptor for use in connection with a standard hole saw. The hole saw guide adaptor has particular utility in connection with allowing an individual to concentrically enlarge the diameter of an existing opening in wood or another material stock.

DESCRIPTION OF THE PRIOR ART

Rotary hole saws are used by carpenters, sheet metal workers, duct work installers, and home workshop owners for sawing holes into a work piece and comprise a thin, hollow cylinder with a cutting edge on the open end and a base formed to support a mandrel on the opposite end. The hole saw utilizes a pilot drill that extends beyond the cutting edge to locate the center of the hole to be sawed. At times the operator of the hole saw will realize that the hole he has made is not large enough. In the past, the operator of the hole saw has been left to his own ingenuity to devise a way of concentrically enlarging the hole. This often necessitated plugging the hole so that the pilot drill bit could be used to properly center the new hole. This process requires extra work, resulting in lost time and could cause frustration and wasted materials when the new hole is not concentric with the first hole. Therefore, a device that allows the operator of a hole saw to easily enlarge an existing hole while maintaining concentricity with the existing hole would save the operator time and material, as well as improving the safety of the procedure.

Devices using an existing hole saw as a guide for enlarging an existing hole exist. Hole saws are available in sizes from one inch to about six inches in diameter. As the diameter of the saw increases, a larger shaft is needed to stabilize the saw. Subsequently, the threaded opening in a hole saw increases for the larger diameter saws. The sizes for these openings range from ⅜" to ⅝", with one of the more popular sizes being ½". When working with multiple precut holes, an operator might find the first hole was cut with a hole saw having a threaded mounting aperture with ⅝" threads and the next hole was cut with a hole saw having a threaded mounting aperture with ½" threads. Interchanging rotational devices to provide a mandrel with the appropriate size could be tedious and could increase the amount of time required to complete a specific job. Additionally, if the original hole came from a hole saw having an incompatible threaded aperture with the hole saw required for the desired enlargement, the operator might not be able to complete the task using the original hole saw for a guide. Therefore, a device which allows hole saws with multiple diameter mounting apertures to be mounted on single mandrel and used as a hole saw guide would increase the productivity of the operator and ensure concentricity of the enlargement with the original circular opening.

The use of hole enlargers is known in the prior art. For example, U.S. Pat. No. 4,968,189 to Joseph A. Pidgeon discloses a device for driving conventional hole saws and for extruding sawed material from within said saws after sawing. The Pidgeon '189 patent has one embodiment for enlarging an existing hole wherein a second saw is mounted in an opposing direction and inside the first hole saw to act as a guide for retaining concentricity with the original hole. However, when implementing this hole enlarging embodiment of the Pidgeon '189 device, the operator must mount an additional shaft and a stabilizing washer, making the process tedious and time consuming. Furthermore, the Pidgeon '189 device does not allow hole saws with varying mounting aperture diameters to be used on a single rotational device.

U.S. Pat. No. 5,413,437 to Michael M. Bristow discloses a double-sided hole saw for enlarging a hole and consisting of a double arbor with a shaft having a slideable first arbor at one end and a fixed second arbor at the other end. The assembly is attached to a drill or other rotating driving means, and the first hole saw is placed into the existing opening where it acts as a pilot bit for the second hole saw. However, the Bristow '437 patent uses a pin to join the arbors on which each hole saw resides. If the hole saws do not reside on arbors of the same diameter, the Bristow '437 device can not be used Furthermore, the small size of the specialty pin joining the two arbors in the Bristow '437 makes it easy to misplace or lose when it is removed from the device.

Similarly, U.S. Pat. No. 4,579,486 to George Damico discloses a hole saw guide for positioning a hole saw while forming a new hole of larger diameter with or without maintaining concentricity with the existing hole. The hole saw permits enlargement of an existing hole by employing a plurality of screws and locking nuts or sliding arms to engage the inner circumference of the existing hole, thereby locating a guide hole for the pilot drill of a larger hole saw. However, the Damico '486 patent makes no provision for guaranteeing concentricity with the existing hole without painstaking measurement and tedious readjustment of the device. Furthermore, lack of concentricity might not be realized until the new hole had been drilled, causing the operator of the Damico '486 device to scrap the material or forcing him to work with a flawed piece.

U.S. Pat. No. 5,743,682 to Ramon William Chancy, Sr. discloses a hole saw guide that includes a conically shaped core member with a central longitudinal aperture and an offset parallel aperture to receive a pilot of a hole saw. A coil spring biases the member against a work piece within an existing hole to resize and reposition a new hole through the work piece. However, the Chaney '682 patent requires the purchase of an entirely new device for resizing holes. This could be expensive and necessitates finding storage space in an already crowded tool box. Additionally, the Chaney '682 device allows the user to offset the center of the new hole only a predetermined distance from the center of the existing hole. This distance is defined in the manufacturing process of the conically shaped core member, requiring the purchase of various core members for moving the hole center a variable distance. Finally, the diameter of the new hole sawed by the Chaney '682 device must be larger enough that the cylindrical hole saw fits around the base of the conically shaped core member. This excludes the use of the Chaney '682 device for smaller holes.

Likewise, U.S. Pat. No. 5,366,326 to Jeffrey M. Converse discloses a hole saw guide consisting of a perforated cylindrical plug fitted to an existing hole wherein the perforation accepts the hole saw pilot drill member, permitting free rotation, and including a stop which prevents passage of the plug through the existing hole. The hole saw guide may include mechanisms for diametric adjustment to lock the plug in the existing hole. However, the Converse '326 patent requires the purchase and use of an entire set of hole size guides for proper usage of the device. This could be expensive and hard to store in an already crowded tool box. Another embodiment of the Converse '326 patent requires the user to use a screw drive to selectively set outer braces on the hole size guides if the guide does not snugly fit in the existing hole. This method of setting the guide is time consuming and not always accurate. If the braces are not set tightly enough, the resulting cut may not be of an acceptable quality.

Lastly, United States Patent Number Des.321, 894 to Raymond L. Harris discloses the ornamental design for a pipe fitting reamer that includes attaching a cylindrical device to the end of the mandrel of a rotating device. However, the Harris '894 patent provides no means for attaching a second cylindrical cutting device that can be used to enlarge a hole having the same diameter as the first cylindrical device attached to the mandrel; therefore, it would not be suitable for the present application.

While the above-described devices fulfill their respective, particular objectives and requirements, the aforementioned patents do not describe a hole size guide adapter that allows an individual to quickly and easily enlarge the diameter of an existing opening in wood or another material stock. The Harris '894 patent is not suitable for enlarging a preexisting hole because it provides no means for attaching a larger second cylindrical cutting device to the mandrel of the rotational device holding the first cylindrical device. Additionally, the Chaney '682 and Converse '326 devices require the purchase of specialty products which could be expensive and necessitate finding storage space in an already crowded tool box for the items. Furthermore, the Chaney '682 device limits how far the center of the new hole can be offset from the center of the existing hole to a predetermined distance defined during the manufacturing process of the conically shaped core member. The Chaney '682 device is also limited to use with larger holes since the diameter of the new hole must be larger enough that the cylindrical hole saw fits around the base of the conically shaped core member. The Pidgeon '189 and Bristow '437 devices require the operator to mount additional specialty hardware, making the process tedious and time consuming. Additionally, the small size of the specialty pin joining the two arbors in the Bristow '437 device makes it easy to misplace or lose when it is removed from the device. Moreover, if the hole saws do not reside on arbors of the same diameter, the Bristow '437 device can not be used for enlarging the preexisting hole. Finally, the Pidgeon '189 device does not allow hole saws with varying mounting aperture diameters to be used on a single rotational device.

Therefore, a need exists for a new and improved hole saw guide adaptor that can be used for allowing hole saws with multiple sizes of mounting holes to be mounted on the shaft of a single rotational device for concentrically enlarging a preexisting hole. In this regard, the present invention substantially fulfills this need. In this respect, the hole saw guide adaptor according to the present invention substantially departs from the conventional concepts and designs of the prior art, and in doing so provides an apparatus primarily developed for the purpose of allowing an individual to concentrically enlarge the diameter of an existing opening in wood or another material stock.

SUMMARY OF THE INVENTION

In view of the foregoing disadvantages inherent in the known types of hole enlargers now present in the prior art, the present invention provides an improved hole saw guide adaptor, and overcomes the above-mentioned disadvantages and drawbacks of the prior art. As such, the general purpose of the present invention, which will be described subsequently in greater detail, is to provide a new and improved hole saw guide adaptor and method which has all the advantages of the prior art mentioned heretofore and many novel features that result in a hole saw guide adaptor which is not anticipated, rendered obvious, suggested, or even implied by the prior art, either alone or in any combination thereof.

To attain this, the present invention essentially comprises an adaptor having a cylindrical shaft with a flattened portion on one end for insertion into a hole saw arbor and a threaded portion on the opposite end for threaded mounting of a conventional hole saw for use as a guide for concentrically lining up the enlarged hole with the existing hole. A special bushing nut is provided for use on the threaded end of the adaptor when the smaller diameter hole saw has a larger mounting aperture than the diameter of the adaptor.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hole saw guide adaptor that has all of the advantages of the prior art hole enlargers and none of the disadvantages.

It is another object of the present invention to provide a new and improved hole saw guide adaptor that may be easily and efficiently manufactured and marketed.

An even further object of the present invention is to provide a new and improved hole saw guide adaptor that has a low cost of manufacture with regard to both materials and labor, and which accordingly is then susceptible of low prices of sale to the consuming public, thereby making such a hole saw guide adaptor economically available to the buying public.

Still another object of the present invention is to provide a new hole saw guide adaptor that provides in the apparatuses and methods of the prior art some of the advantages thereof, while simultaneously overcoming some of the disadvantages normally associated therewith.

Even still another object of the present invention is to provide a hole saw guide adaptor for allowing an individual to easily and concentrically enlarge a preexisting hole in a work surface. This allows the user to eliminate any trial and error methods previously used to enlarge existing holes, ensuring concentricity on the first attempt and saving time, money, and materials.

Still yet another object of the present invention is to provide a hole saw guide adaptor which allows an individual to easily and quickly enlarge a preexisting hole with standard tools such as a drill and hole saws. This reduces the amount of time needed to complete such a task and eliminates the need to purchase specialty products.

Lastly, it is an object of the present invention to provide a new and improved hole saw guide adaptor for allowing an individual to use hole saws fitted for use on drills with varying mandrel diameters. This allows an individual to use a single drill for enlarging an existing hole even if the hole saws are meant for use on drills with different mandrel diameters.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
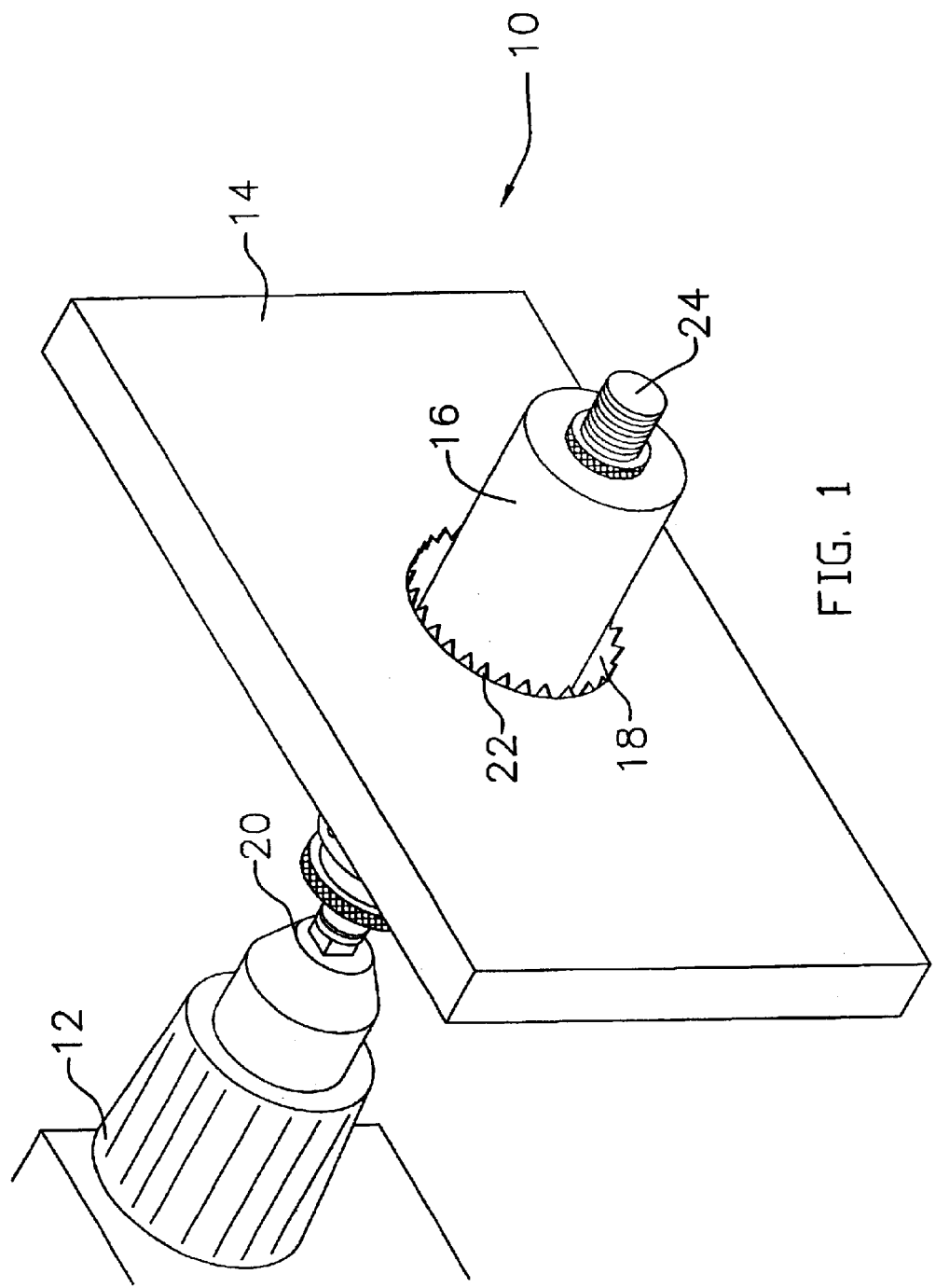
FIG. 1 is a left perspective view of the preferred embodiment of the hole saw guide adaptor constructed in accordance with the principles of the present invention and mounted on a rotational device.
Figure 2:
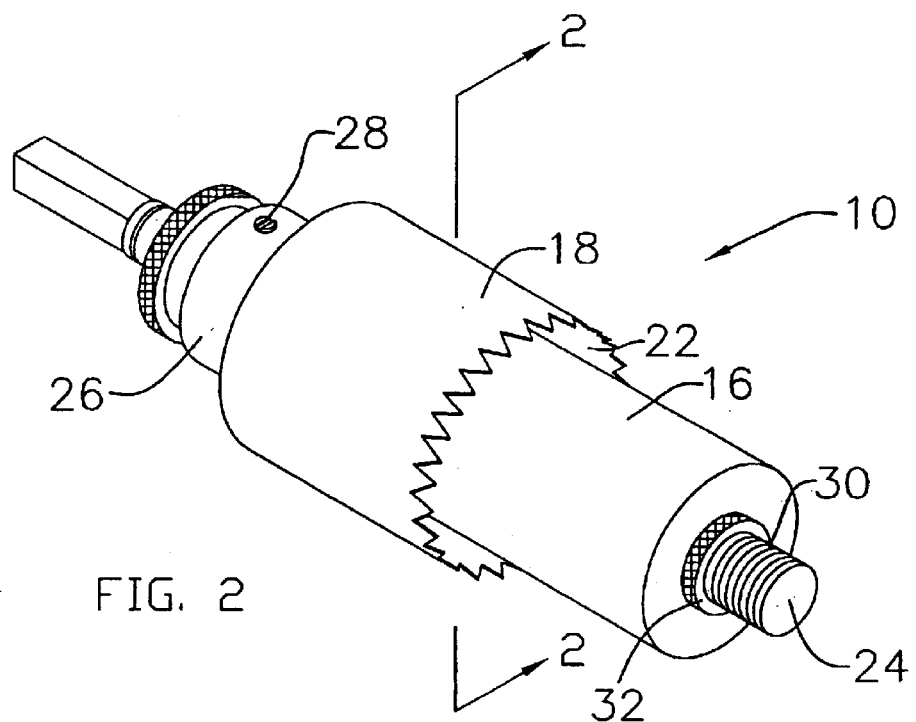
FIG. 2 is a left perspective view of the hole saw guide adaptor of the present invention.
Figure 3:
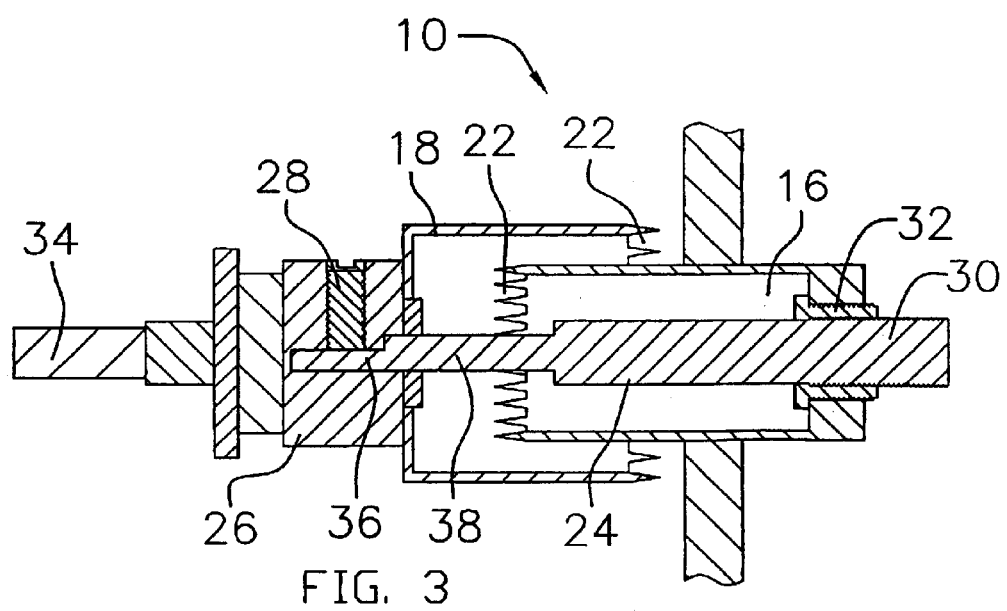
FIG. 3 is a left cross sectional view of the hole saw guide adaptor of the present invention taken along the longitudinal axis.

Referring now to the drawings, and particularly to FIGS. 1–3, a preferred embodiment of the hole saw guide adaptor of the present invention is shown and generally designated by the reference numeral 10.

In FIG. 1, a new and improved hole saw guide adaptor 10 of the present invention for allowing an individual to concentrically enlarge the diameter of an existing opening in wood or another material stock is illustrated and will be described. More particularly, the hole saw guide adaptor 10 is mounted on a drill 12 to provide the rotational force necessary to cut a hole in the work surface 14. Specifically, the adaptor 10 is used in combination with a smaller cylindrical hole saw 16 having the same diameter as the hole to be enlarged and a larger cylindrical hole saw 18 having the same diameter as the desired enlargement. The larger hole saw 18 is mounted on the adaptor 10 at the drill chuck 20 with its cutting edge 22 pointing toward the work surface 14. The smaller hole saw 16 is mounted within the larger hole saw 18 with its cutting edge pointing toward the drill 12. The adaptor 10 replaces the drill bit and provides a variable diameter shaft 24 (see FIG. 3) onto which both hole saws, 16 and 18, are mounted.

FIG. 2 shows a left side perspective view of the hole saw guide adaptor 10 with two hole saws, 16 and 18, mounted on it. The larger diameter hole saw 18 is connected to the hole saw arbor 26. The drill bit is replaced with the adaptor 10, which is secured by tightening the set 10 screw 28. The smaller diameter hole saw 16 is mounted on the threaded end 30 of the adaptor 10 with its cutting edge 22 facing the opposite direction of that of the larger diameter hole saw 18. A bushing nut 32 is mounted on the threaded end 30 of the adaptor 10 when the mounting aperture of the smaller hole saw 16 is larger than the diameter of the adaptor shaft 24.

FIG. 3 shows a left side cross sectional view taken along the longitudinal axis of the hole saw guide adaptor 10. The hole saw arbor 26 is attached to the hex shaft 34 of the drill 12. The adaptor 10 has a cylindrical configuration and measures approximately ½ inch diameter (maximum) and 4½ inches in length. The hole saw guide adaptor 10 replaces the drill bit in the arbor 26 and is secured by tightening the set screw 28. The arbor insertion end 36 of the adaptor 10 is approximately ¼ inch in diameter by ¼ inch in length and features a flattened section, similar to that of a drill bit, for insertion into the arbor 26. The larger diameter hole saw 18 is mounted on the center portion 38 of the adaptor shaft 24 with its cutting edge 22 facing the work surface 14. The center portion 38 of the adaptor shaft 24 is approximately 5/16 inch in diameter by 1 inch in length. The adaptor shaft 24 widens to a ½ inch diameter for approximately 2¾ inches in length. The last inch of the shaft 24 is threaded for mounting the smaller diameter hole saw 16. A threaded bushing nut 32, having ½ inch threads on the inside and 5/8 inch threads on the outside, is used when the mounting aperture of the smaller hole saw 16 has a larger diameter than the adaptor shaft 24.

In use, it can now be understood that the hole saw operator would determine the proper hole saw 18 to use for the desired hole enlargement. This hole saw 18 would then be mounted on the hole saw arbor 26. The user would then loosen the set screw 28, remove the drill bit, and replace it with the hole saw guide adaptor 10. The adaptor 10 is inserted into the arbor 26 and locked in place with the set screw 28. The hole saw 16 with the same diameter as the original hole is then mounted on the threaded end 30 of the adaptor shaft 24. If the mounting aperture of the smaller diameter hole saw 16 is larger than the threaded end 30 of the adaptor shaft 24, the user would secure the threaded bushing nut 32 onto the shaft 24 and mount the saw 16 onto the nut 32. The user would then proceed to insert the smaller hole saw 16 into the existing hole in the work surface 14, using it as a guide to center the new hole as it is cut. The hole saws, 16 and 18, and the hole saw guide adaptor 10 can easily be removed from the drill when the new hole has been cut.

While a preferred embodiment of the hole saw guide adaptor has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal may be used for the hole saw guide adaptor. Also, the threaded bushing nut could be provided in various sizes as necessary, and the shaft of the adaptor could be varied if necessary.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hole saw guide adaptor comprising:

a cylindrical shaft having a first end with a flattened area parallel to the longitudinal axis of said shaft, a middle portion, and a second end having an elongated portion extending from said middle portion and a threaded portion;

wherein the diameter of said middle portion of said shaft is slightly larger than the diameter of said first end of said shaft and the diameter of said second end of said shaft is slightly larger than said diameter of said middle portion of said shaft.

2. A hole saw guide adaptor comprising:

a cylindrical shaft having a first end with a flattened area parallel to the longitudinal axis of said shaft, a middle portion, and a second end having an elongated portion extending from said middle portion and a threaded portion; and a bushing nut removably connected to said threaded portion of said second end of said shaft, wherein said bushing nut has a shaft with an external surface and a cap and is formed with a longitudinal threaded aperture passing through said shaft and said cap.

3. The hole saw guide adaptor of claim 2 wherein said threaded aperture of said bushing nut has a diameter approximately equal to the diameter of said threaded portion of said second end of said shaft wherein said bushing nut can be screwed onto said threaded portion of said shaft.

4. The hole saw guide adaptor of claim 3 wherein said aperture of said bushing nut is threaded in a direction requiring said threaded portion of said shaft of said adaptor to first be placed into said cap of said bushing nut.

* * * * *